Patented Mar. 1, 1960

2,927,096

REDOX RESINS

Saul Soloway, New Rochelle, N.Y.

No Drawing. Application July 20, 1954
Serial No. 444,649

3 Claims. (Cl. 260—51)

This invention relates to certain polyhydroxyphenol-aldehyde resins which function as reversible electron exchangers, and is a continuation in part of my application for redox resins filed June 8, 1953, serial number 360,367, now abandoned. These resins are cross linked, and hence, are infusible and insoluble in all solvents. In their reduced form these polymers act as electron donors and in their oxidized form as electron acceptors. Since hydrogen ion accompanies each electron transfer, these resins may be called hydrogen donors or hydrogen acceptors. Unlike the common oxidants and reductants which remain in solution together with their reaction products, these redox resins, being totally insoluble in both the reduced and oxidized states, add no foreign matter to any prospective reactant. In this respect these materials behave like hydrogen adsorbed on a metal catalyst. The hydrogenation is carried out without any contamination because of the total insolubility of the catalyst.

Some redox resins have been prepared by Cassidy and his co-workers. His early work on thermal polymerization of vinyl hydroquinone yielded rather low molecular weight products as shown by their solubility in many common solvents such as ether, alcohol, and acetone. Such materials would have little value in columns or beds for electron exchange. However, his most recent work on the copolymerization of vinyl hydroquinone and divinyl benzene yields a resin insoluble in the common solvents. This latest composition is purported to be a useful redox material.

Cassidy proposed hydroquinone-formaldehyde polymers as possible redox resins. Such resins were prepared by me in both aqueous and glacial acetic acid solution in the presence of sulfuric acid as a catalyst. Contrary to the behavior of catechol-aldehyde, pyrogallol-aldehyde, and other polyphenolaldehyde resins in which the phenolic groups are adjacent on an aromatic ring, the hydroquinone-formaldehyde resins were found to have little reducing action on ferric ion, ferricyanide ion, and iodine. These reductants were chosen as examples of the three general types, namely, cationic, anionic, and neutral respectively.

Among others, there are two possible reasons for this difference in behavior between aldehyde resins of ortho and para dihydroxy phenols. The first is a steric consideration. The hydroxyl groups in the hydroquinone polymers are surrounded either by a substituent initially present or by a group derived from the aldehyde linking rings with one another. Such a situation severely hinders the approach of a reducible molecule or ion. This effect becomes greater as the linking group increases in bulk, e.g. in going from formaldehyde to furfural. In the case of catechol, however, the proximity of the hydroxyl groups permits a larger free surface area for a reactant to approach the reaction site.

The second reason is the synergistic action of the adjacent hydroxyl groups in the formation of chelates with metallic ions. Electron transfer follows chelation in the cases of those oxidizing cations having high enough potentials. This chelating property is impossible in the case of the para dihydroxy phenols.

The mode of preparation of these resins is of prime importance. Several investigators including myself have reacted catechol, pyrogallol, and similar phenols with formaldehyde and furfural in water solution using strong inorganic acid catalysts. The recipe given consists of codissolving all the materials in water, boiling the solution until the polymer has precipitated, filtering, washing free of solubles, and drying. The resulting polymers are finely divided brown or black powders. These materials have good redox capacity but suffer from dimensional instability. During any redox cycle some of the resin breaks down to give microscopic as well as colloidal particles. The breakdown products filter through one inch thick glass wool or paper plugs. Whether this behavior is due to insufficient cross linking of the resin prepared in the above manner in aqueous solution, or to chemical breakdown by the reagents used during the cycle has not been resolved. However, I have found that if an organic solvent in lieu of water is used in the above recipe, the amount of observable breakdown during use is nil. I have also found that water may be used as a reaction medium to produce a dimensionally stable resin if and only if the solution of the reactants is set aside at or below room temperature to form a gel. This gel can then be hardened by heating with aqueous acid. The prior formation of gels has the added advantage of allowing control of the particle size distribution of the final product. The gel mass can be broken down to size requirement.

The following paragraphs summarize the manner of preparation of dimensionally stable resins of the redox type discussed herein in three different types of media.

1. USE OF WATER AS A SOLVENT

In the use of water as a solvent a solution of the reactants is prepared and set aside at room temperature or below until gelation sets in. The rate of this reaction depends on the nature and concentration of the reactants, the temperature, the catalyst concentration, etc. In my experience this stage may take from ten minutes to a month. In most cases the controlling variables may be adjusted so that gelation occurs in ten hours. The gel is then broken up into the desired particle size, and the mixture is boiled from one to ten hours. This step causes thorough cross linking and, hence, produces a resin which is infusible and insoluble in the common solvents. Materials prepared in this way show excellent stability in use on redox cycles.

2. USE OF ORGANIC SOLVENTS

Organic solvents are excellent media for carrying out these polymerizations. Dimensionally stable resins are prepared by cosolution of the reactants and catalyst followed by refluxing for periods of ½ to 10 hours. However, if one wishes to control particle size, one should go through the gelation step as described in the previous paragraph. Solvents such as alcohols, ethers, ketones, Cellosolves, carboxylic acids have been found to be excellent for this purpose.

3. USE OF ORGANIC DISPERSION MEDIA

These resins can be prepared as spheroidal particles by dispersing a solution of the required polyphenol in the aldehyde or aldehyde derivative in a hydrocarbon or chlorinated hydrocarbon medium. Ligroin, kerosene, and hexyl chloride serve well. The dispersion is heated to 60°–120° C. followed by the dropwise addition of 96% sulfuric acid as the catalyst. Stirring and heating is continued from one to fifteen hours, i.e. until hardened spheroidal particles are formed. The size distribution depends on such factors as temperature, stirring rate, nature of reactants, etc. An emulsifier may also be used in the reaction medium to further modify size distribution.

In all of these preparations a molar ratio of aldehyde to polyphenol greater than 1 must be used in order to get cross linking. If a ratio less than 1 is used, such as in the work of Rhodes, low molecular weight, soluble, fusible polymers result. This ratio is most important in controlling the degree of cross linking. In practice ratios of 1 to 2½ have been used.

I have found that besides aldehydes per se, many derivatives thereof give substantially the same polymers. Examples of such derivatives are acetals, hemiacetals, enol acetates, alkylidene diacetates, and dienolic anhydrides such as furan. Depending on the nature of the solvent, these derivatives may or may not be converted to the parent aldehyde. For example, if furan is reacted with a polyphenol in aqueous acid, some of it will undoubtedly be hydrolyzed to succindialdehyde. In glacial acetic acid as the solvent furan would probably be solvolyzed to the dienol diacetate of succindialdehyde, in methanol to the corresponding hemiacetal or acetal, etc.

The term polyhydroxyphenols as used in this application is limited to those derivatives which have at least two hydroxyl groups adjacent to one another on an aromatic ring or to those which have at least two hydroxyl groups on aromatic carbon atoms separated by one or two aromatic carbon atoms incapable of bearing hydrogen or any substituent. All of these derivatives form quinones on oxidation. Further, it is essential that at least one unsubstituted position be present in order for condensation with aldehydes to be possible. Examples of such polyphenols having one aromatic ring are catechol, pyrogallol, and 1,2,4,5 tetrahydroxybenzene. Some derivatives of biphenyl which fall into this category are: 2,2' dihydroxybiphenyl and 2,2',4,4' tetrahydroxybiphenyl. Similar derivatives of naphthalene are: 1,2 dihydroxy naphthalene; 1,4,5 trihydroxynaphthalene (prepared by reduction of the natural quinone, juglone); 1,4,5,8 tetrahydroxynaphthalene (preparable from naphthazarine by reduction). 2,2' Dihydroxybiphenyl and 1,4,5 trihydroxy naphthalene are examples in which chelation of metallic ions occurs even though the electron donor groups are in separate rings.

I have found that phenols of the above defined class may have other substituents present in addition to the requirements stated. For example, gallic acid, catechol sulfonic acid, and 1,2 dihydroxy, 4-naphthalene sulfonic acid yield excellent polymers. It is very possible to substitute in the final polymer with other groups. Some of the prepared resins are easily sulfonated in the cold with 96% sulfuric acid.

In the case of polyphenols like penta hydroxybenzene or the isomeric tetrahydroxy benzenes, which have fewer than three unsubstituted positions on the ring, it is necessary to copolymerize such compounds with catechol or other compounds capable of undergoing cross linking.

The preparations carried out are summarized in Table I. The various methods used for these preparations are described below. Table I shows which variation was applied in each particular case.

Method 1

55 grams of catechol, 100 ml. of 37% aqueous formaldehyde were dissolved in 500 ml. water and the solution cooled down to 0° C. in an ice bath. To this solution 30 ml. of 37% aqueous hydrochloric acid was added keeping the temperature between 0° to 20° C. The mixture was allowed to stand at 20°–30° C. until gelation took place. It was broken down into small pieces, diluted with 1 liter of 5% hydrochloric acid, and refluxed for one hour. After cooling the precipitate was filtered, washed with many portions of hot water to leach out all solubles, and air dried.

Variations of this experiment showed that the smaller the acid concentration and the less the heating time, the lighter the color of the final product.

It was also found in some cases that the resin could be purged of solubles more readily by boiling with organic solvents such as methanol, ethanol, glacial acetic acid or acetone. A final wash with ether aided in drying the product.

Method 2

25 grams of pyrogallol, 50 ml. methanol and 40 ml. furfural were codissolved and cooled to 15° C. To this solution hydrochloric acid gas was passed in until saturation. After gelation the mixture was diluted with 500 ml. methanol containing 5% hydrochloric acid (passed in as a gas), and the mixture boiled for 4 hours. The polymer was broken up and washed with several portions of boiling methanol. It was then dried.

Method 3

25 grams of pyrogallol, 40 ml. furfural, 400 ml. glacial acetic acid were codissolved. A mixture of 15 grams of anhydrous aluminum chloride in 125 ml. glacial acetic acid was added dropwise over a period of 15 minutes. The mixture was then boiled for 3 hours, allowed to stand overnight, filtered, boiled up with several portions of methanol to extract all solubles, and finally air dried.

Method 4

25 grams of pyrogallol, 40 ml. furfural, 400 ml. glacial acetic acid were codissolved. A solution of 25 ml. 96% sulfuric acid in 100 ml. glacial acetic acid was quickly added. The mixture was allowed to stand until gelation set in. The gel was broken up, and boiled up with 400 ml. of glacial acetic acid containing 10 ml. of 96% sulfuric acid. After filtering, boiling up with several portions of ethanol, it was air dried.

Method 5

25 grs. catechol, 15 grams of trioxane, and 250 ml. of anhydrous formic acid were codissolved. After passing in dry hydrochloric acid gas until saturation, the solution was refluxed with stirring for 3 hours. The product was worked up as given method 3.

Method 6

50 ml. furan, 30 grams of catechol, and 500 ml. β,β' dichlorooethyl ether. The mixture was kept at 40° C. for two hours on a steam bath so as to induce polymerization without volatilizing the furan. It was then heated at 80° C. for 8 hours with stirring. The resin was filtered after cooling and worked up as in Method 3.

In those instances in which glacial acetic acid was used as the solvent the mixture was refluxed for 6 to 8 hours.

Method 7

12 grams of 2,5 dihydroxy para quinone were suspended in 150 ml. glacial acetic acid. 25 grams of zinc dust were added and the solution refluxed while hydrochloric acid gas was passed in intermittently. The quinone was converted to 1,2,4,5 tetrahydroxy benzene after one hour of this treatment. 5 grams of trioxane were then added and the mixture boiled for another 2 hours. The resulting polymer was worked up by filtration, boiled up with aqueous HCl to dissolve any remaining zinc, given several methanol washes, and finally air dried.

Method 8

This experiment is the same as method 7 except that after reduction of the quinone 3 grams of catechol are added with 5 grams of trioxane and the procedure is carried as described.

Method 9

10 grams of naphthazarin (5.8 dihydroxy 1,4 naphthoquinone) were dissolved in 200 ml. glacial acetic acid and 20 ml. of 96% sulfuric acid. 15 grams of zinc dust were added and the mixture boiled until the original red solution became a light grayish green. The naphthazarin was at that point reduced to 1,4,5,8 tetrahydroxynaphthalene. 10 grams of trioxane was then added and the mixture boiled for 5 hours. The black solid was filtered, washed with water, boiled up with successive portions of 1 normal aqueous hydrochloric acid, washed with methanol, and dried.

*Method 10*

20 grams of catechol and 15 grams of trioxane were suspended in 200 ml. of ligroin (boiling range 90°–120°). The mixture was heated to 70° with stirring (about 300 r.p.m.). To this two phase liquid system was added 5 ml. of 96% sulfuric acid. The temperature was then raised to the boiling point and the mixture stirred for 8 hours. The resulting polymer was filtered, boiled up with several portions of methanol to extract solubles, and dried. Most of this material consisted of spheroidal particles. Particle size can be controlled to a large extent by temperature variation and stirring rate. A small amount of material deposited as a film on the flask surface.

*Method 11*

The details of this experiment were the same as Method 10 except that kerosene or hexyl chloride was the dispersion medium. In these experiments the temperature of the medium was maintained at 110° C. ±10 instead of at the boiling point after all the ingredients had been added.

In all of these methods the yield of polymer was quantitative, based on the amount of polyhydric phenol as the limiting reactant.

All the resins herein described reduce ferric ion, ferricyanide ion, and iodine. The following is an outline of the method employed to demonstrate the reversible redox properties of these resins. 25 grams of dry resin (material prepared in Example 10, Table I) was packed into a Jones reductor (2.5 cm. diameter) between plugs of glass wool. The height of the resin column was 15 cm. 25 grams of ferric chloride hexahydrate were dissolved in 300 ml. water and this solution was run through the column with the aid of suction. The eluate was colourless and gave negative tests for ferric ion with potassium thiocyanate and beta-resorcylic acid solutions. This colourless solution on treatment with sodium ferricyanide gave a typical prussian blue precipitate showing the presence of ferrous ion in the eluate. This result was confirmed by the oxidation of a portion of the eluate with hydrogen peroxide, followed by the addition of beta-resorcylic acid to give a typical red-purple color.

The column can be reactivated by the use of solutions of reductants such as chromous chloride or sodium hydrosulfite. An electrolytic method was also devised such that the resin column was made the cathode of an electrolytic cell. After reduction the column is washed free of foreign matter with dilute mineral acid followed by distilled water.

The same resin column after reactivation was used to demonstrate the reduction of sodium ferricyanide and iodine in aqueous solution. 2 grams of sodium ferricyanide in 100 ml. of water was passed through in 15 minutes. The eluate was light yellow and gave a positive test for ferrocyanide ion and a negative test for ferricyanide ion. The column was washed down with tap water, dilute hydrochloric acid, and finally distilled water until the eluate was free of foreign ions. 100 ml. of a saturated aqueous iodine solution was passed through. The eluate showed no trace of iodine, but gave a copious precipitate of silver iodide on addition of silver nitrate.

The polymers, which have stable intermediate oxidation states between the most and the least hydrogenated, have an even wider range of utility than the others previously described. For example, 1,4,5,8 tetrahydroxynaphthalene reduces ferric ion, ferricyanide ion, and iodine. In these reactions each polyphenol unit presumably goes to the oxidation state analogous to naphthazarin. However, I have shown that stronger oxidants such as chromic acid and ceric sulfate oxidize the polymer to the diquinone state. In that state the polymer in turn oxidizes ferrous, ferrocyanide, and iodide ions. The same observations have been made with 1,2,4,5 tetra-

TABLE I.—SUMMARY OF EXPERIMENTS

| | Polyhydroxyphenol | Aldehyde or derivative thereof | Solvent or Dispersion medium | Catalyst | Conditions and Remarks | Method |
|---|---|---|---|---|---|---|
| 1 | catechol | 37% aq. formaldehyde | water | HCl | gelled then boiled | 1 |
| 2 | do | 40% aq. chloroacetaldehyde | do | HCl | do | 1 |
| 3 | do | 30% aq. glyoxal | do | HCl | do | 1 |
| 4 | do | 30% aq. glycollic aldehyde | do | HCl | do | 1 |
| 5 | pyrogallol | 40% aq. chloroacetaldehyde | do | HCl | do | 1 |
| 6 | do | furfural | methanol | HCl | do | 2 |
| 7 | do | do | acetic acid | $AlCl_3$ | boiled | 3 |
| 8 | do | do | do | $H_2SO_4$ | gelled then boiled | 4 |
| 9 | catechol | trioxane | formic acid | HCl gas | boiled | 5 |
| 10 | do | do | acetic acid | $H_2SO_4$ | gelled then boiled | 4 |
| 11 | do | dimethyl chloroacetal | formic acid | HCl gas | boiled | 5 |
| 12 | do | do | furan | $H_2SO_4$ | gelled then boiled | 4 |
| 13 | do | do | β,β' dichoro diethyl ether | $H_2SO_4$ | heated at 80° C | 6 |
| 14 | do | methylol | isopropanol | $AlCl_3$ | gelled then boiled | 4 |
| 15 | pyrogallol | trioxane | ethylene glycol diethyl ether | $H_2SO_4$ | heating at 80° C | 6 |
| 16 | catechol | do | acetone | $AlCl_3$ | gelled then boiled | 4 |
| 17 | do | do | ethyl acetate | HCl gas | boiled | 5 |
| 18 | pyrogallol | furfural | dioxane | $H_2SO_4$ | heat at 80° C | 6 |
| 19 | do | do | methyl isobutyl ketone | HCl gas | boiled | 5 |
| 20 | catechol | furan | ethylene glycol dimethyl ether | $H_2SO_4$ | gelled then boiled | 4 |
| 21 | 1,2,4,5 tetrahydroxy benzene | trioxane | acetic acid | $H_2SO_4$ | boiled | 7 |
| 22 | 1,2,4,5 tetrahydroxy benzene+catechol | do | do | $H_2SO_4$ | do | 8 |
| 23 | pentahydroxy benzene+catechol | do | do | $H_2SO_4$ | do | 8 |
| 24 | gallic acid | do | do | $H_2SO_4$ | gelled then boiled | 4 |
| 25 | catechol-4-sulfonic acid | do | do | $H_2SO_4$ | boiled | 6 |
| 26 | 1,2 dihydroxy naphthalene-4-sulfonic acid | do | do | $H_2SO_4$ | do | 6 |
| 27 | 1,4,5 trihydroxy naphthalene | do | do | $H_2SO_4$ | do | 9 |
| 28 | 2,2' dihydroxy biphenyl | do | do | $H_2SO_4$ | do | 6 |
| 29 | 1,4,5,8 tetra hydroxy naphthalene | do | do | $H_2SO_4$ | do | 9 |
| 30 | catechol | do | ligroin (90°–120° C.) | $H_2SO_4$ | do | 10 |
| 31 | do | do | kerosene | $H_2SO_4$ | heated at 110° C | 11 |
| 32 | do | do | hexyl chloride | $H_2SO_4$ | do | 11 |
| 33 | do | furfural | ligroin (90°–120° C.) | $H_2SO_4$ | boiled | 10 |
| 34 | pyrogallol | trioxane | do | $H_2SO_4$ | do | 10 |
| 35 | do | furan | do | $H_2SO_4$ | heated at 40° for 2 hours, then boiled | 10 |
| 36 | do | furfural | do | $H_2SO_4$ | boiled | 10 | hydroxy benzene polymers. Thus, many of the common redox couples can be either oxidized or reduced depending on the oxidation state of the resin.

I have also found these chelating resins to be useful in binding metal ions. These experiments were carried out in the same fashion as the redox ones. For example, a 0.1 molar solution of cobaltous chloride was passed through the resin column. The excess was washed out with distilled water until the eluate was free of cobalt ion. 1 molar hydrochloric acid was then passed through, and cobalt ion was demonstrated in the eluate. Similar results were obtained with nickel chloride, ferrous sulfate, uranyl acetate, lead nitrate, mercuric chloride, and cadmium chloride.

Having so described my invention, I do not limit myself to the specifically mentioned times, temperatures, quantities of chemicals, or steps of procedure, as these are given simply to clearly describe my invention as set forth in my specification and claims, and they may be varied without going beyond the scope of my invention.

I claim:

1. An insoluble, infusible, cross linked, redox resin which is the acid condensation product with an aldehyde material selected from the group consisting of an aliphatic aldehyde, furfural, and a compound capable of yielding an aliphatic aldehyde under the reaction conditions, of a polyhydroxylated phenol of not more than twelve aromatic ring carbon atoms, all of said ring carbon atoms being bound to each other by carbon-carbon bonds, having four to five hydroxyl groups attached to said aromatic carbon atoms, having two pairs of phenolic hydroxyl groups capable of forming metallic chelates and having at least one aldehyde reactive position on the aromatic ring, there being in addition to said polyhydroxylated phenol also the phenol, catechol, as the sole additional phenol whenever the number of aldehyde reactive positions on the aromatic ring of the polyhydroxylated phenol is less than three, said polyhydroxylated phenol being oxidizable to a quinone, the ratio of the number of moles of said aldehyde material to the number of moles of total phenol being in the range of 1.1–2.5 to 1.

2. A resin according to claim 1 wherein th epolyhydroxylated phenol is 1,4,5,8 tetrahydroxynaphthalene and the aldehyde material is formaldehyde.

3. A resin according to claim 1 wherein the phenol content is 1,2,4,5 tetrahydroxybenzene and catechol and the aldehyde is formaldehyde.

References Cited in the file of this patent
UNITED STATES PATENTS

| | | |
|---|---|---|
| 2,275,923 | Ross | Mar. 10, 1942 |
| 2,304,431 | Walker | Dec. 8, 1942 |
| 2,477,641 | Nagel | Aug. 2, 1949 |
| 2,478,943 | Rhodes | Aug. 16, 1949 |
| 2,700,029 | Cassidy | Jan. 18, 1955 |
| 2,703,792 | Kropa | Mar. 8, 1955 |

OTHER REFERENCES

Adams et al.: J. Soc. Chem. Ind., Jan. 11, 1935, pages 1T to 6T.

Wang et al.: J. Chem. Eng. China, vol. 16, pages 25–28, 1949, abstracted in C. A., 368, Jan. 10, 1950.

Manecke, Z. F.: Electrochemie, vol. 57, No. 3, April 1953, pages 189–194.